United States Patent [19]

Tozuka

[11] Patent Number: 5,412,417
[45] Date of Patent: May 2, 1995

[54] VIDEO TELEPHONE DEVICE WITH AUTOMATIC VIDEO CAMERA ANGLE ADJUSTMENT

[75] Inventor: Yukitaka Tozuka, Machida, Japan

[73] Assignee: Toshiba Corporation, Kanagawa, Japan

[21] Appl. No.: 46,306

[22] Filed: Apr. 15, 1993

[30] Foreign Application Priority Data

Apr. 17, 1992 [JP] Japan ................ 4-097593

[51] Int. Cl.⁶ .............................................. H04N 7/14
[52] U.S. Cl. ........................................ 348/14; 348/20
[58] Field of Search ............... 379/53, 54, 96; 358/85; H04N 7/14; 348/14, 15, 16, 20

[56] References Cited

U.S. PATENT DOCUMENTS

| | | | |
|---|---|---|---|
| 4,856,045 | 8/1989 | Hoshina | 379/53 |
| 5,008,924 | 4/1991 | Guichard et al. | 379/53 |
| 5,111,498 | 5/1992 | Guichard et al. | 379/53 |
| 5,170,427 | 12/1992 | Guichard et al. | 379/53 |

FOREIGN PATENT DOCUMENTS 2-180485  7/1990  Japan .

3296384  12/1991  Japan ................ H04N 7/14

*Primary Examiner*—Curtis Kuntz
*Assistant Examiner*—Stella L. Woo
*Attorney, Agent, or Firm*—Finnegan, Henderson, Farabow, Garrett & Dunner

[57] ABSTRACT

A video telephone device has a video display unit tiltably mounted on a base and a video camera unit supported in the video display unit on one side of a video display panel of the video display unit. The video display unit includes an outer housing and a video display panel disposed in the outer housing and angularly movably supported on the base. The video camera unit is disposed in the outer housing and includes a camera mount and a video camera supported on the camera mount, the camera mount being angularly movably supported on the video display panel. A link is angularly movably coupled to the camera mount and the base. The base, the video display panel, the camera mount, and the link jointly serve as a parallel link mechanism for keeping the video camera unit in a substantially constant angular position with respect to the base regardless of angular movement of the video display unit with respect to the base.

34 Claims, 6 Drawing Sheets

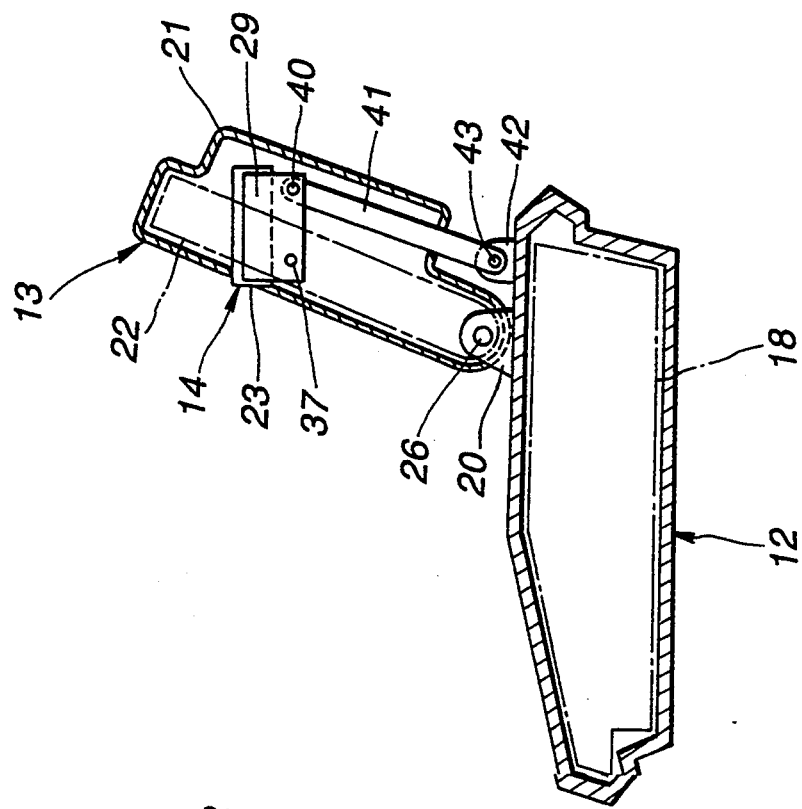
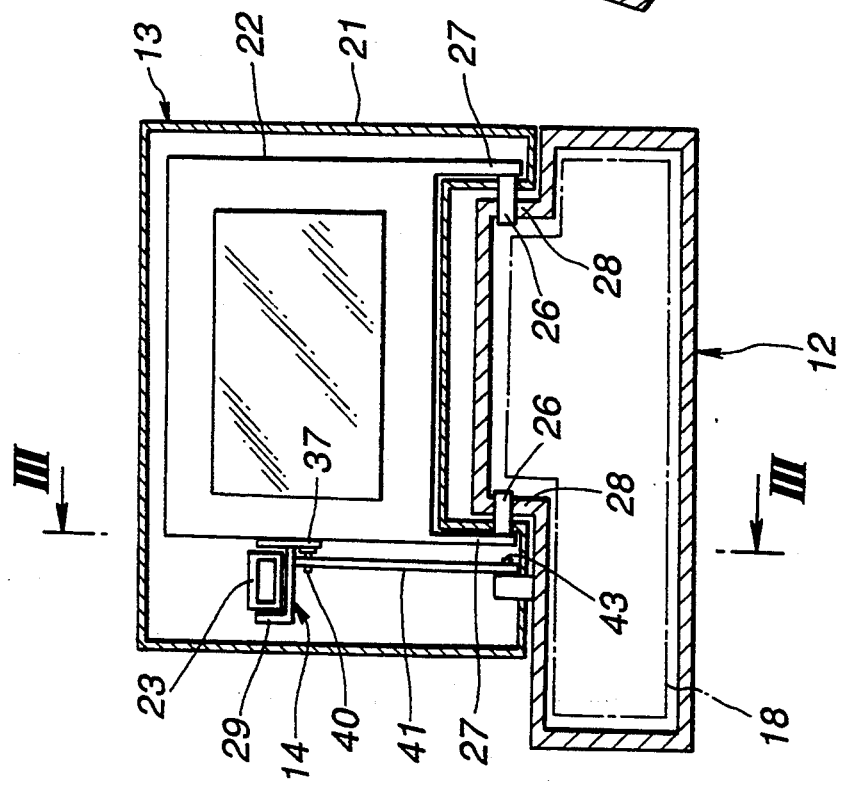

VIDEO TELEPHONE DEVICE WITH AUTOMATIC VIDEO CAMERA ANGLE ADJUSTMENT

BACKGROUND OF THE INVENTION

1. Field of the Invention

The present invention relates to a video telephone device having a video camera unit mounted in a tiltable video display unit.

2. Description of the Relevant Art

There is known a video telephone device with a video camera unit mounted in a video display unit that is manually tiltable for the user to view a clearer image displayed on a video display panel in the video display unit. However, when the video display unit is tilted to avoid reflections from light sources such as fluorescent lamps for a better displayed image on the video display unit, the video camera unit is also tilted with the video display unit. When tilted, the video camera unit changes its field of view, and transmits an image that is different from an intended image to the video telephone device of the other party with whom the user communicates. For example, after the video camera unit has been tilted with the video display unit, the video camera unit that has been transmitting an image of the user's face may send an image of the user's neck and breast. Therefore, each time the video display unit is tilted, the user is required to manually adjust the angle of the video camera unit such that the video camera unit is directed toward the user's face again.

SUMMARY OF THE INVENTION

It is therefore an object of the present invention to provide a video telephone device having a video camera unit which can automatically be angularly adjusted to keep its field of view constant even when a video display unit containing the video camera unit is tilted.

According to the present invention, there is provided a video telephone device comprising a base, a video display unit coupled to the base for angular movement about a first axis, a video camera unit coupled to the video display unit for angular movement about a second axis, and a link having one end coupled to the video camera unit for angular movement about a third axis and an opposite end coupled to the base for angular movement about a fourth axis, the first, second, third, and fourth axes being positioned with respect to each other such that a straight line passing through the first and second axes extends parallel to a straight line passing through the third and fourth axes, and a straight line passing through the first and fourth axes extends parallel to a straight line passing through the second and third axes.

According to the present invention, there is also provided a video telephone device comprising a base, a video display unit angularly movably mounted on the base, a video camera unit angularly movably mounted in the video display unit, and link means operatively coupled between the base and the video camera unit for keeping the video camera unit in a substantially constant angular position with respect to the base regardless of angular movement of the video display unit with respect to the base. The video display unit comprises an outer housing and a video display panel disposed in the outer housing and angularly movably supported on the base. The video camera unit is disposed in the outer housing and comprises a camera mount and a video camera supported on the camera mount, the camera mount being angularly movably supported on the video display panel. The link means comprises a link operatively coupled between the camera mount and the base substantially parallel to the video display panel.

According to the present invention, there is further provided a video telephone device comprising a base, a telephone circuit housed in the base, a handset removably mounted on the base, a video display unit including an outer housing and a video display panel disposed in the outer housing and angularly movably supported on the base, a video camera unit disposed in the outer housing and including a camera mount and a video camera supported on the camera mount, the camera mount being angularly movably supported on the video display panel, and a link angularly movably coupled to the base and the camera mount, the base, the video display panel, the camera mount, and the link jointly serving as a parallel link mechanism for keeping the video camera unit in a substantially constant angular position with respect to the base regardless of angular movement of the video display unit with respect to the base.

According to the present invention, there is also provided a video telephone device comprising a base, a telephone circuit housed in the base, a handset removably mounted on the base, a video display unit including an outer housing and a video display panel disposed in the outer housing and angularly movably supported on the base, a video camera unit disposed in the outer housing laterally adjacent to the video display panel and including a camera mount and a video camera supported on the camera mount, the camera mount being angularly movably supported on the video display panel, and a link angularly movably coupled to and extending between the base and the camera mount, the base, the video display panel, the camera mount, and the link jointly serving as a parallel link mechanism for keeping the video camera unit in a substantially constant angular position with respect to the base regardless of angular movement of the video display unit with respect to the base.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a cross-sectional view of the video telephone device shown in FIG. 1;

FIG. 3 is a cross-sectional view taken along line III—III of FIG. 2;

DETAILED DESCRIPTION OF THE PREFERRED EMBODIMENTS

Figure 1:
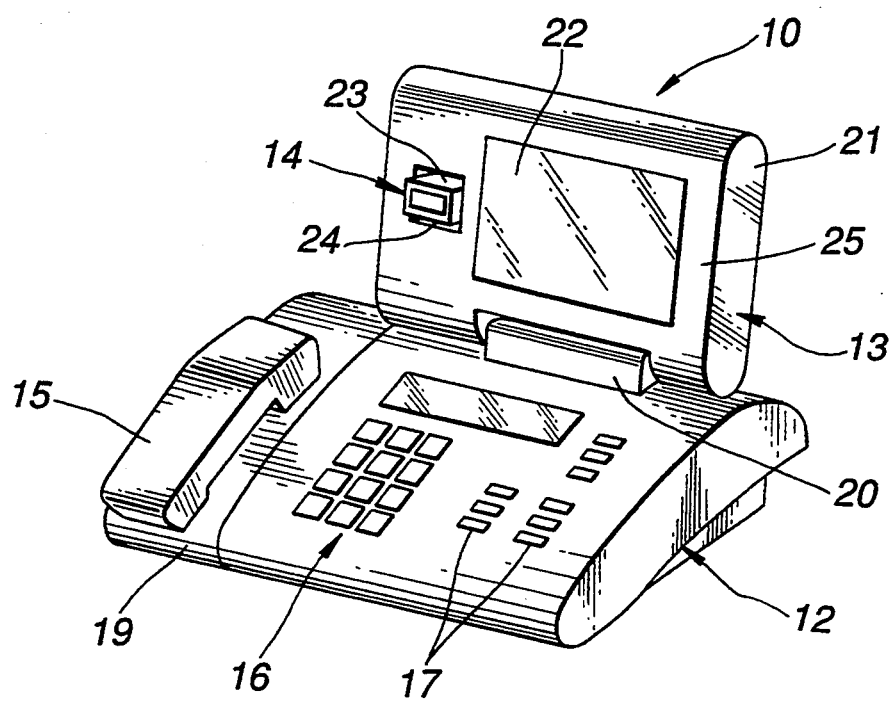
FIG. 1 is a perspective view of a video telephone device according to an embodiment of the present invention.

As shown in FIG. 1, a video telephone device, generally designated by the reference numeral 10, according to an embodiment of the present invention generally comprises a base 12, a video display unit 13 tiltably mounted on a rear end of the base 12, a video camera unit 14 tiltably mounted in the video display unit 13, and a handset 15 normally placed on the base 12.

The base 12 has a push-button keypad 16 with twelve keys and various other push-button keys 17 on its upper inclined panel. The base 12 also houses a telephone circuit 18 (see FIGS. 2 and 3) which is electrically connected to the keys of the push-button keypad 16, the push-button keys 17, and the handset 15. The base 12 includes a handset holder 19 on one side of the push-button keypad 16 for holding the handset 15 thereon.

The video display unit 13 is angularly movably coupled or hinged at its lower end to an upwardly projecting support 20 on the upper end of the base 12. The video display unit 13 has an outer casing 21 which houses a video display panel 22 and the video camera unit 14 laterally adjacent to the video display panel 22. The video camera unit 14 includes a video camera 23 having a front end, which contains a lens, positioned in a rectangular opening 24 defined in a front panel 25 of the outer housing 21.

As shown in FIGS. 2 and 3, the video display panel 22 has a pair of pivot pins (first axis) 26 projecting horizontally from respective downwardly extending end arms 27 through vertical walls of the outer housing 21 toward each other. The pivot pins 26 are angularly movably supported on opposite vertical ends 28 of the support 20 on the base 12.

Figure 4:
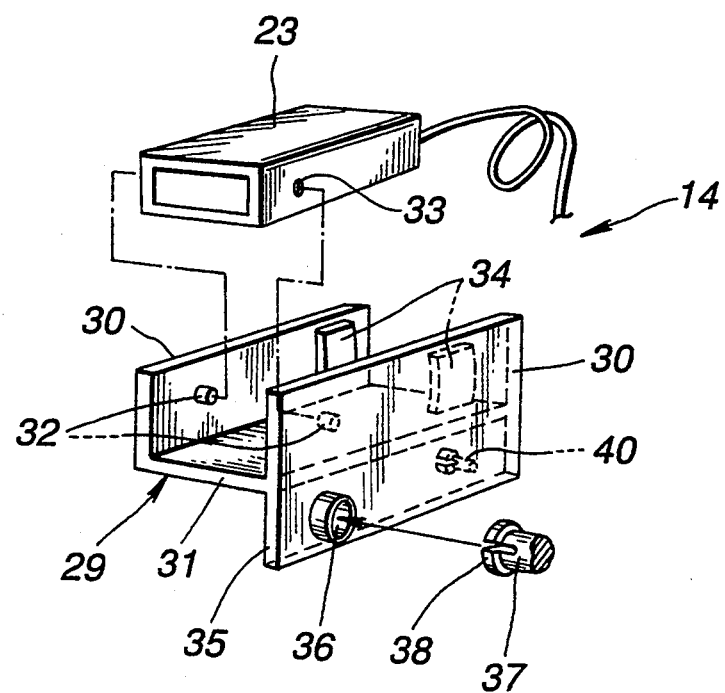
FIG. 4 is an exploded perspective view of the video camera unit.
Figure 5:
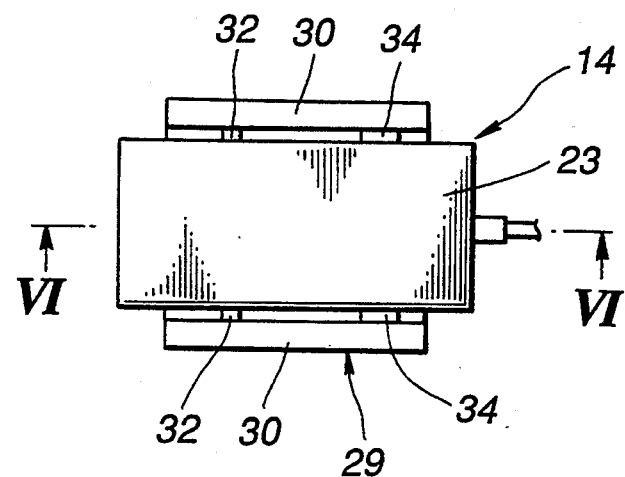
FIG. 5 is a plan view of the video camera unit.
Figure 6:
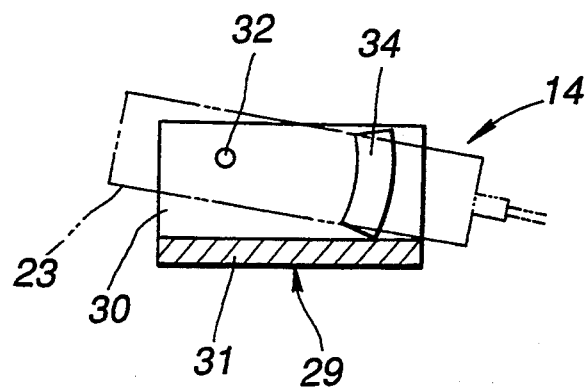
FIG. 6 is a cross-sectional view taken along line VI—VI of FIG. 5.

As shown in FIG. 4, the video camera unit 14 includes a camera mount 29 having a pair of laterally spaced vertical side walls 30 joined to each other by a lower wall 31. The side walls 30 have respective pivot pins 32 projecting from inner surfaces thereof toward each other. The pivot pins 32 are fitted respectively in holes 33 defined in respective side walls of the video camera 23 near its front end. The rear end of the video camera 23 is frictionally sandwiched between friction plates 34 attached to the respective inner surfaces of the side walls 30 rearwardly of the pivot pins 32, as also shown in FIGS. 5 and 6. The video camera 23 can therefore be tilted about the pivot pins 32 and frictionally retained in a desired angular position with respect to the camera mount 29 by the friction plates 34 (see FIG. 6).

Figure 7:
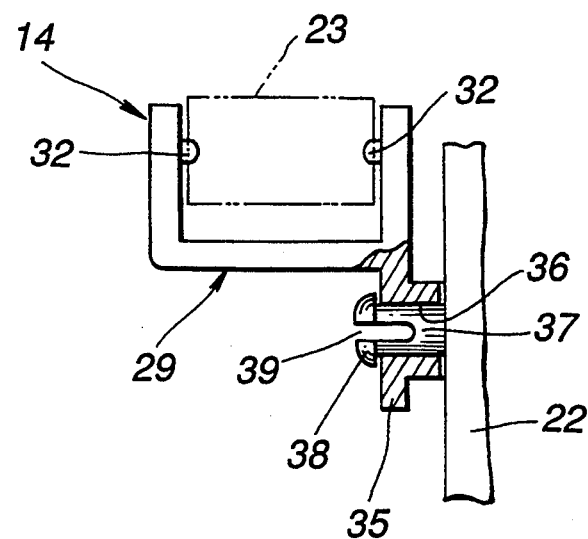
FIG. 7 is a fragmentary elevational view, partly in cross section, of a camera mount that is joined to a video display panel.

As illustrated in FIG. 7, the camera mount 29 includes a vertical wall 35 aligned with and extending downwardly from one of the side walls 30. The vertical wall 35 has a hole 36 defined therein substantially below the pivot pin 32. The video display panel 22 has a pivot pin (second axis) 37 projecting horizontally from one side thereof parallel to the pivot pins 32 and snugly fitted angularly movably in the hole 36. Therefore, the video camera unit 14 is coupled to the video display unit 22 for angularly movement about the pin 37 with respect to the video display unit 22. The pivot pin 37 has an enlarged head 38 on its distal end and also has a slot 39 defined axially therein across the head 38. When the pivot pin 37 is forced into the hole 36, the slot 37 allows the enlarged head 38 to flex radially inwardly, permitting the pivot pin 37 to be easily inserted into the hole 36. After the pivot pin 37 is fully fitted in the hole 36, the enlarged head 38 snaps out of the hole 36, and prevents the pivot pin 37 from being subsequently removed from the hole 36.

Figure 8:
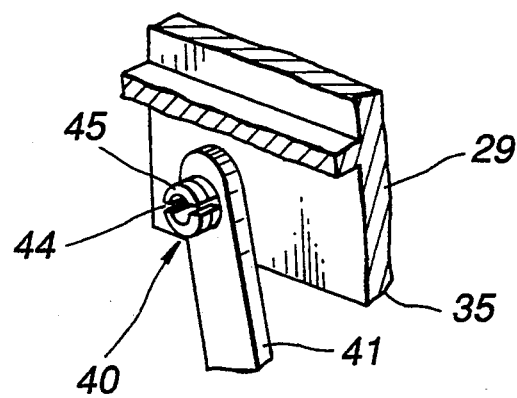
FIG. 8 is a fragmentary perspective view of the camera mount and a link connected thereto.

As shown in FIGS. 4 and 8, the vertical wall 35 has a pivot pin (third axis) 40 projecting horizontally from a surface thereof remote from the video display panel 22. The pivot pin 40 is snugly fitted angularly movably in a hole defined in an upper end of a link 41 extending between the base 12 and the camera mount 29. The link 41 is positioned on one side of the video display panel 22 and behind the plane of the video display panel 22 within the outer housing 21. The link 41 has a lower end angularly movably coupled to a support 42 (see FIGS. 2 and 3) on the upper end of the base 12 through a pivot pin (fourth axis) 43. The pivot pin 40 also has an enlarged head 44 on its distal end and an axial slot 45. Therefore, the pivot pin 40 can easily be inserted into the hole of the link 41 and, once inserted, is locked against removal from the link 41.

Figure 9:
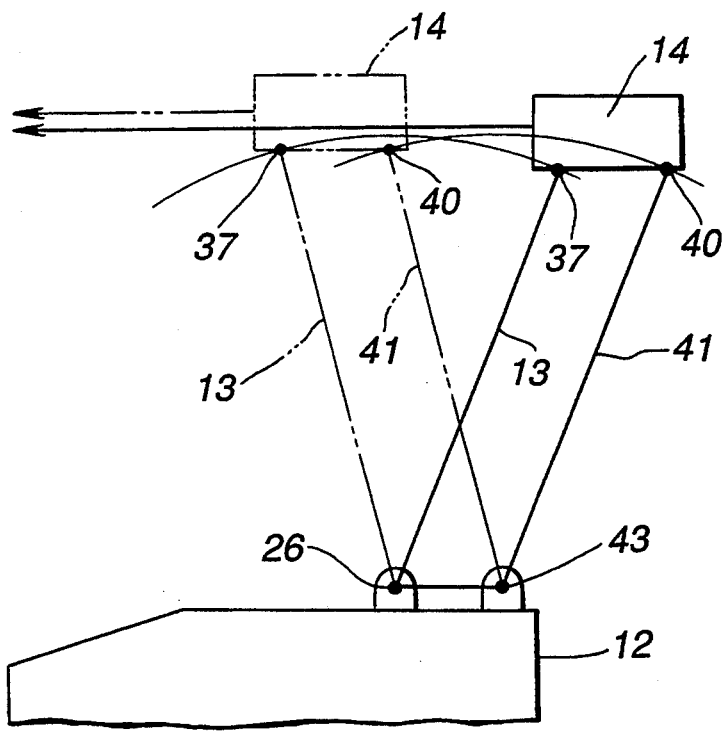
FIG. 9 is a schematic view illustrative of the manner in which a video camera unit of the video telephone device moves when a video display unit is tilted.

As shown in FIG. 9, the pivot pins 26, 43 are spaced from each other by a distance which is substantially the same as the distance by which the pivot pins 37, 40 are spaced from each other, and the pivot pins 26, 37 are spaced from each other by a distance which is substantially the same as the distance by which the pivot pins 40, 43 are spaced from each other. Thus, a straight line passing through the pivot pins 26, 37 extends substantially parallel to a straight line passing through the pivot pins 40, 43, and a straight line passing through the pivot pins 26, 43 extends substantially parallel to a straight line passing through the pivot pins 37, 40. Consequently, the base 12, the video display panel 22, the camera mount 29, and the link 41 jointly serve as a parallel link mechanism.

Operation of the video telephone device 10 will be described below.

Before using the video telephone device 10 for communication through the handset 15 and the video display unit 13, the user initially adjusts the video camera 23 through a desired vertical angle, i.e., tilts the video camera 23 about the pivot pins 32 so that it is directed to the eyes of the user, while confirming the user's image produced by the video camera 23 on the video display panel 22. With the video camera 23 being thus angularly adjusted, the image of the user's face will be produced in a proper field of view and properly be displayed on the video display panel of the video telephone device of the party with whom the user will communicate. Then, the user tilts the video display unit 13 to an angular position best suitable for the user to view images that will be displayed on the video display panel 22 while avoiding reflections from light sources. When the video display unit 13 is tilted, the video camera unit 14 is translated, i.e., is moved parallel to the base 12 without changing its angular position, by the parallel link mechanism as shown in FIG. 9. Therefore, even when the video display unit 13 is tilted, the field of view of the video camera unit 14 does not change, and hence the frame in which the user's face is displayed on the video displayed unit of the other party does not change either.

Upon tilting movement of the video display unit 13, the video camera unit 14 vertically moves slightly and also moves toward or away from the user's face slightly as can be seen from FIG. 9. However, any shift caused of the frame of the user's image and the focused condition of the user's image due to such slight movement of the video camera unit 14 is so small that it is practically negligible.

Figure 10:
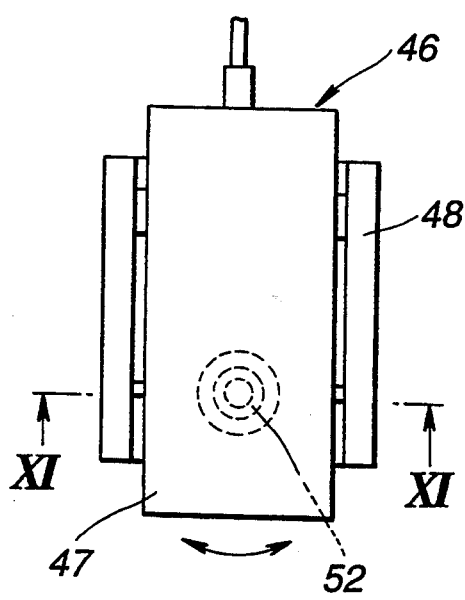
FIG. 10 is a plan view of a video camera unit of a video telephone device according to another embodiment of the present invention.
Figure 11:
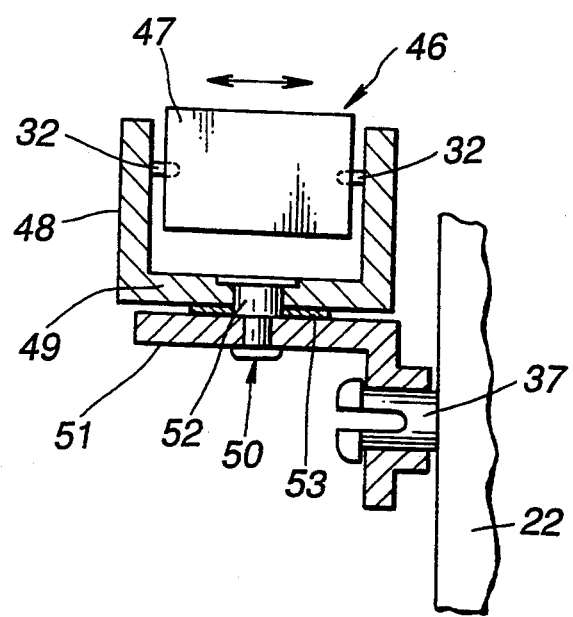
FIG. 11 is a cross-sectional view taken along line XI—XI of FIG. 10.

FIGS. 10 and 11 show a video camera unit of a video telephone device according to another embodiment of the present invention. The video camera unit, generally designated by the reference numeral 46, has a video camera 47 angularly movably supported on a camera mount 48 for angular movement about pivot pins 32. The camera mount 48 has a lower wall 49 supported by a swivel mechanism 50 on an arm 51 that is connected to the video display unit 22 through the pivot pin 37. The swivel mechanism 49 comprises a support shaft 52 extending through the lower wall 49 of the camera mount 48 and the arm 50 perpendicularly to the axis of the pivot pins 32, and a spacer 53 interposed between the lower wall 49 and the arm 50 and disposed around the support shaft 52. The camera mount 48 can swivel about the support shaft 52 with respect to the arm 51. The swivel mechanism 49 allows the user to horizontally turn the video camera unit 46 through a desired horizontal angle, i.e., swivel the video camera unit 46 about the support shaft 52, for initially directing the video camera unit 46 toward the user's face.

Although certain preferred embodiments of the present invention have been shown and described in detail, it should be understood that various changes and modifications may be made therein without departing from the scope of the appended claims.

What is claimed is:

1. A video telephone device comprising:
   a base;
   a video display unit coupled to said base for angular movement about a first axis;
   a video camera unit coupled to said video display unit for angular movement about a second axis; and
   a link having one end coupled to said video camera unit for angular movement about a third axis and an opposite end coupled to said base for angular movement about a fourth axis;
   said first, second, third, and fourth axes being positioned with respect to each other such that a straight line passing through said first and second axes extends parallel to a straight line passing through said third and fourth axes, and a straight line passing through said first and fourth axes extends parallel to a straight line passing through said second and third axes.

2. A video telephone device according to claim 1, wherein said video display unit comprises an outer housing and a video display panel disposed in said outer housing, said outer housing being angularly movably mounted on said base through a pivot pin as said first axis, and wherein said video camera unit comprises a camera mount and a video camera supported on said camera mount, said camera mount being angularly movably mounted on said video display panel through a pivot pin as said second axis.

3. A video telephone device according to claim 2, wherein said one end of the link is angularly movably joined to said camera mount through a pivot pin as said third axis, and said opposite end of the link is angularly movably joined to said base through a pivot pin as said fourth axis.

4. A video telephone device according to claim 1, wherein said video camera unit comprises a camera mount and a video camera supported on said camera mount for angular movement about an axis parallel to said second axis.

5. A video telephone device according to claim 1, wherein said video camera unit comprises a camera mount and a video camera supported on said camera mount, said camera mount being supported on said video display unit for angular movement about an axis perpendicular to said second axis.

6. A video telephone device according to claim 1, wherein said video camera unit comprises a camera mount, a video camera angularly movably supported on said camera mount, and pivot means for allowing said video camera to be brought into an angular position directed toward the face of a user of the video telephone device, independently of said video display unit.

7. A video telephone device according to claim 6, wherein said pivot means comprises a pivot pin mounted on said camera mount and fitted in a hole defined in said video camera.

8. A video telephone device according to claim 6, wherein said pivot means comprises a support shaft mounted on said camera mount and connected to said video display unit.

9. A video telephone device according to claim 6, wherein said video camera unit further comprises retaining means for frictionally retaining said video camera in said angular position.

10. A video telephone device according to claim 9, wherein said retaining means comprises a friction plate attached to said camera mount and frictionally held against said video camera.

11. A video telephone device comprising:
    a base;
    a video display unit angularly movably mounted on said base;
    a video camera unit angularly movably mounted in said video display unit; and
    link means operatively coupled between said base and said video camera unit for keeping said video camera unit in a constant angular position with respect to said base regardless of angular movement of said video display unit with respect to said base,
    wherein said video display unit comprises an outer housing and a video display panel disposed in said outer housing and angularly movably supported on said base, and said video camera unit is disposed in said outer housing and comprises a camera mount and a video camera supported on said camera mount, said camera mount being angularly movably supported on said video display panel, and
    wherein said link means comprises a link operatively coupled between said base and said camera mount parallel to said video display panel.

12. A video telephone device comprising:
    a base;
    a video display unit angularly movably mounted on said base;
    a video camera unit angularly movably mounted in said video display unit; and
    link means operatively coupled between said base and said video camera unit for keeping said video camera unit in a constant angular position with respect to said base regardless of angular movement of said video display unit with respect to said base, wherein said video camera unit comprises a camera mount, a video camera angularly movably supported on said camera mount, and pivot means for allowing said video camera to be brought into an angular position directed toward the face of a user of the video telephone device, independently of said video display unit.

13. A video telephone device according to claim 12, wherein said pivot means comprises a pivot pin mounted on said camera mount and fitted in a hole defined in said video camera.

14. A video telephone device according to claim 12, wherein said pivot means comprises a support shaft mounted on said camera mount and connected to said video display unit.

15. A video telephone device according to claim 12, wherein said video camera unit further comprises retaining means for frictionally retaining said video camera in said angular position.

16. A video telephone device according to claim 15, wherein said retaining means comprises a friction plate attached to said camera mount and frictionally held against said video camera.

17. A video telephone device comprising:
a base;
a video display unit including an outer housing and a video display panel disposed in said outer housing and angularly movably supported on said base;
a video camera unit disposed in said outer housing and including a camera mount and a video camera supported on said camera mount, said camera mount being angularly movably supported on said video display panel; and
a link angularly movably coupled to said base and said camera mount;
said base, said video display panel, said camera mount, and said link jointly serving as a parallel link mechanism for keeping said video camera unit in a constant angular position with respect to said base regardless of angular movement of said video display unit with respect to said base.

18. A video telephone device according to claim 17, wherein said video camera unit further comprises pivot means for allowing said video camera to be brought into an angular position directed toward the face of a user of the video telephone device, independently of said video display unit.

19. A video telephone device according to claim 18, wherein said pivot means comprises a pivot pin mounted on said camera mount and fitted in a hole defined in said video camera.

20. A video telephone device according to claim 18, wherein said pivot means comprises a support shaft mounted on said camera mount and connected to said video display unit.

21. A video telephone device according to claim 18, wherein said video camera unit further comprises retaining means for frictionally retaining said video camera in said angular position.

22. A video telephone device according to claim 21, wherein said retaining means comprises a friction plate attached to said camera mount and frictionally held against said video camera.

23. A video telephone device comprising:
a base;
a telephone circuit housed in said base;
a handset removably mounted on said base;
a video display unit including an outer housing and a video display panel disposed in said outer housing and angularly movably supported on said base;
a video camera unit disposed in said outer housing laterally adjacent to said video display panel and including a camera mount and a video camera supported on said camera mount, said camera mount being angularly movably supported on said video display panel; and
a link angularly movably coupled to and extending between said base and said camera mount;
said base, said video display panel, said camera mount, and said link jointly serving as a parallel link mechanism for keeping said video camera unit in a constant angular position with respect to said base regardless of angular movement of said video display unit with respect to said base.

24. A video telephone device according to claim 23, wherein said video camera unit further comprises pivot means for allowing said video camera to be brought into an angular position directed toward the face of a user of the video telephone device, independently of said video display unit.

25. A video telephone device according to claim 24, wherein said pivot means comprises a pivot pin mounted on said camera mount and fitted in a hole defined in said video camera.

26. A video telephone device according to claim 25, wherein said pivot means comprises a support shaft mounted on said camera mount and connected to said video display unit.

27. A video telephone device according to claim 24, wherein said video camera unit further comprises retaining means for frictionally retaining said video camera in said angular position.

28. A video telephone device according to claim 27, wherein said retaining means comprises a friction plate attached to said camera mount and frictionally held against said video camera.

29. A video telephone device comprising:
a base;
a video display unit angularly movably mounted on said base;
a video camera unit angularly movably mounted in said video display unit; and
means operatively coupled between said base and said video camera unit for keeping said video camera unit in a constant angular position with respect to said base in response to angular movement of said video display unit with respect to said base,
wherein said video display unit comprises an outer housing and a video display panel disposed in said outer housing and angularly movably supported on said base, and said video camera unit is disposed in said outer housing and comprises a camera mount and a video camera supported on said camera mount, said camera mount being angularly movably supported on said video display panel, and
wherein said means comprises a link operatively coupled between said base and said camera mount parallel to said video display panel.

30. A video telephone device comprising:
a base;
a video display unit angularly movably mounted on said base;
a video camera unit angularly movably mounted in said video display unit; and means operatively coupled between said base and said video camera unit for keeping said video camera unit in a constant angular position with respect to said base in response to angular movement of said video display unit with respect to said base,
wherein said video camera unit comprises a camera mount, a video camera angularly movably supported on said camera mount, and pivot means for allowing said video camera to be brought into an angular position directed toward the face of a user of the video telephone device, independently of said video display unit.

31. A video telephone device according to claim 30, wherein said pivot means comprises a pivot pin mounted on said camera mount and fitted in a hole defined in said video camera.

32. A video telephone device according to claim 30, wherein said pivot means comprises a support shaft mounted on said camera mount and connected to said video display unit.

33. A video telephone device according to claim 30, wherein said video camera unit further comprises retaining means for frictionally retaining said video camera in said angular position.

34. A video telephone device according to claim 33, wherein said retaining means comprises a friction plate attached to said camera mount and frictionally held against said video camera.

* * * * *